United States Patent [19]

Smith

[11] 4,390,642
[45] Jun. 28, 1983

[54] FLAME-RETARDANT, THERMOSETTING FOAM PRODUCT AND METHOD OF PREPARING SAME

[75] Inventor: Stuart B. Smith, Conyers, Ga.

[73] Assignee: Thermocell Development, Ltd., Knoxville, Tenn.

[21] Appl. No.: 281,290

[22] Filed: Jul. 7, 1981

Related U.S. Application Data

[63] Continuation-in-part of Ser. No. 238,467, Feb. 26, 1981, Pat. No. 4,350,776.

[51] Int. Cl.³ .............................................. C08G 18/32
[52] U.S. Cl. ................................... 521/112; 521/111; 521/126; 521/127; 521/136; 521/163; 521/166; 521/902; 521/906
[58] Field of Search ............... 521/111, 112, 131, 126, 521/127, 136, 163, 166, 902, 906

[56] References Cited

U.S. PATENT DOCUMENTS

| | | | |
|---|---|---|---|
| 3,692,706 | 9/1972 | Igglesden | 521/136 |
| 3,919,127 | 11/1975 | Larsen et al. | 521/136 |
| 3,975,319 | 8/1976 | Larsen et al. | 521/136 |
| 4,221,875 | 9/1980 | Yukata et al. | 521/163 |
| 4,293,657 | 10/1981 | Nissen et al. | 521/166 |
| 4,302,551 | 11/1981 | Horn et al. | 521/163 |

*Primary Examiner*—Morton Foelak
*Attorney, Agent, or Firm*—Richard P. Crowley

[57] ABSTRACT

A flame-retardant, rigid, thermosetting foam product is prepared by reacting, in the presence of a blowing agent and a catalyst, particularly an organic metal catalyst, a furfural alcohol polymer, a phenol-formaldehyde resin, a melamine and methylene diphenyl isocyanate, which reaction provides for a rigid foam characterized by low friability and good heat- and flame-resistant properties.

13 Claims, No Drawings

FLAME-RETARDANT, THERMOSETTING FOAM PRODUCT AND METHOD OF PREPARING SAME

REFERENCE TO PRIOR APPLICATION

This application is a continuation-in-part of U.S. Ser. No. 238,467 filed Feb. 26, 1981, now U.S. Pat. No. 4,350,776 which application is hereby incorporated by reference.

The parent application is directed to a method of preparing a thermosetting foam product, which method comprises: reacting a furfuryl-alcohol polymer with a phenol-formaldehyde resin, having a mole ratio of phenol to formaldehyde of from about 1:1.2 to 1:2.0, in the presence of from about 1 to 15 parts per 100 parts of polymer and resin of a blowing agent and of from about 0.05 to 10 parts per 100 parts of polymer and resin of a catalytic amount of a sulfonic-acid catalyst and a small cell-control amount of a silicone surfactant, to effect the generally simultaneous condensation of the phenol-formaldehyde resin and the condensation of the furfuryl-alcohol polymer, the amount of the polymer and the resin ranging from about 10% to 90% by weight of the reaction mixture, and the polymer comprising an acid-catalyzed furfuryl-alcohol polymer which generally comprises a head-to-tail polymerization of the furfuryl alcohol in the polymer chain, and having reactive hydroxyl groups in the polymer, to provide an integral thermosetting foam product characterized by low-friability, high-compressive-strength and good flame-resistant properties.

BACKGROUND OF THE INVENTION

Thermosetting foam products are prepared by the use of phenol-formaldehyde resin, blowing agents and strong acidic catalysts, and typically are characterized by having a fairly brittle foam structure, with low compression strength and exhibiting high friability and brittleness properties. Phenolic foams, which are acid-catalyzed, while often having acceptable properties, in that they are difficult to burn, melt or smoke, are characterized by having a substantially open-cell structure and very little, if any, strength at low density; for example, below about 2.5 pounds per cubic foot, a thermoconductivity similar to polystyrene foams, and having corrosion problems, due to the presence of the strong acid catalyst.

It is desirable to prepare rigid, thermosetting, strong, substantially closed-cell-type foam products exhibiting low density and with a substantially neutral pH, which foam products are characterized by good thermoconductivity approaching that of, or better than, the polyisocyanurates foams as well as having desirable heat and flame properties, such as foams, which will not substantially burn, smoke or melt.

SUMMARY OF THE INVENTION

My invention relates to a thermosetting foam product, to the method of preparing and using the foam product, and in particular to a thermosetting foam product characterized by low friability and good heat and flame resistance. More particularly, my unique foam product and method of preparing the product relates to the reaction of a phenol-formaldehyde resin, a furfural-alcohol polymer, a melamine and a methylene diphenyl isocyanate.

A unique thermosetting, rigid foam product is prepared in accordance with my invention, by the reaction of a phenolic resin, either of the resole or benzylic ether type, with the benzylic ether type being preferred; a furfural-alcohol polymer, particularly a furfural-alcohol polymer having head-to-tail polymerization; melamine; and methylene diphenyl isocyanate. The reaction is typically carried out in the presence of a blowing agent, such as a volatile liquid fluorocarbon, and in particular in the presence of a catalyst which is unaffected by the acid present in the system, and which catalyst typically is not hydrolyzed under the reaction conditions, and more particularly is generally an organo-metallic catalyst. Optionally and preferably, the reaction is also carried out in the presence of a surfactant or cell control agent such as a silicone surfactant, to improve the formation of the cell and foam properties of the resulting foam, and with a non-volatile liquid haloalkane particularly perchloroethylene to improve the friability properties of the resulting rigid, thermosetting foam.

The resulting unique thermosetting foam product is a highly cross-linked foam with high structural strength, exhibiting good flame and heat resistance at temperatures up to 430° F., with little shrinkage or distortion. The resulting foam product may be used in environments, where other acidic, catalyzed phenolic foams are unsatisfactory, due to corrosion problems. The foam produced is a closed-cell or substantially closed-cell-type foam having a low density, particularly, for example, below 5.0 pounds per cubic foot, and typically 2.5 to 2.0 or below pounds per cubic foot, having a generally neutral pH, and which foam does not substantially burn, smoke or melt. The rigid foam product produced in accordance with the invention is useful in construction as a building material and may be employed in the manufacture of pipe insulation, where high temperatures and good K factors are required, such as in cold storage systems, roofing board, sheathing or spray applications, where polyurethanes and similar flammable polymeric materials may no longer be employed.

The foam of my invention is prepared through the use of a one-stage resole phenol-formaldehyde resin, for example, wherein the mole ratio of the phenol to formaldehyde ranges from about 1:1.2 to 1:2.0; for example, 1:1.2 to 1:1.4. A phenol-formaldehyde resin of the benzylic ether type is preferred.

Another reactant employed in the preparation of my thermosetting, rigid foam products comprises a furfural-alcohol polymer, which furfural-alcohol polymer generally has a head-to-tail polymerization of the furfural alcohol, and which may, for example, have a hydroxyl number ranging from about 50 to 400, and more typically 100 to 200. It has been found that the employment of furfural alcohol, alone, does not provide for an acceptable or satisfactory rigid foam product, in accordance with my invention. Typically, the furfural-alcohol polymer is prepared by an acid catalyst under controlled conditions, whereby furfural alcohol is reacted to provide substantially head-to-tail polymerization.

Another reactant in the method of preparing my rigid foam product comprises the use of melamine or similar amine-type reactant which will react with the free formaldehyde in the phenolic resin, thereby providing a foam with reduced smoke formation.

A further reactant in the method of preparing my unique foam product comprises the employment of a methylene diphenyl isocyanate. The methylene diphenyl isocyanate, apparently, engages in a competing reaction with the free phenol in the phenolic resin, while the phenolic resin is also reacting with the furfural-alcohol polymer, to provide a unique cross-linked, highly structured, rigid foam product.

In the preparation of my thermosetting foam product, the reactants are reacted in the presence of a catalyst which is not affected by acid or a low pH and which is not hydrolyzed in an acid environment, with the catalyst employed in an amount sufficient to effect the complete cure or cross-linking of the reactants, to provide for a rigid foam. The catalyst provides for the condensation of the phenolic resin, as well as the polymerization of the furfural-alcohol polymer and the methylene diphenyl isocyanate. It has been found that organo metal catalysts, such as cadmium, antimony and the like; for example, those type of catalysts and accelerators used as urethane-foam-type catalysts particularly, catalyst may be used as trimerization catalyst for polyisocyanurate foams employed in the practice of my invention. For example, the organo metal catalyst may comprise alkyl fatty-acid tin catalyst, such as a $C_1$-$C_4$ alkyl $C_8$-$C_{16}$ hydrocarbon carboxylic tin catalyst, such as a dibutyl tin dilaureate or other similar organo-metal catalysts.

The reaction is carried out in the presence of a blowing agent, and typical blowing agents which may be employed include physical and chemical blowing agents, as well as mechanical blowing techniques. However, the preferred blowing agent and technique comprise the employment of liquid physical blowing agents which are volatile liquids introduced into the reaction mixture, and which produce a blowing gas, through vaporization of the blowing agent or through decomposition of the blowing agent during the exotherm of the reaction. Suitable blowing agents are short-chain aliphatic hydrocarbons; for example, in the $C_3$-$C_7$ range, and their chlorinated and fluorinated analogs, such as the fluoro and chloro alkanes known as Freon (a registered trademark of E. I. du Pont de Nemours & Co.), methylene chloride, and similar blowing agents. The blowing agents may be employed in amounts ranging from 0.5 to 15 parts; for example, 1 to 10 parts, per 100 hundred parts by weight of the phenol resin and furfural-alcohol polymer employed in the reaction mixture.

It has been found that it is desirable to employ on inert liquid non-volatile halocarbon in the reaction mixture to improve the surface friability and the brittleness of the resulting foam product. Chloro and fluoro $C_2$-$C_4$ alkanes like the foam products and particularly on a cost basis, perchloroethylene has been found to be useful as a nonreactive diluent which substantially reduces or eliminates surface friability in the rigid foam. The liquid halocarbon diluents should have boiling points higher than the maximum exotherm temperature, such as greater than 200° F. or greater than 240° F. For example, perchloroethylene has been found to be particularly useful with benzylic ether types of phenol resin in reducing the viscosity of the highly viscous ether resin, typically 30,000 to 40,000 cps to less than 6,000 cps. While not wishing to be bound by any theory or explanation, it is believed that the inert halocarbon diluent increases the reaction time without entering into the reaction and permits the exotherm heat to cure the foam more slowly, to provide a foam with little surface friability and improved dimensional stability. For example, the rigid foam produced with 25 parts of perchloroethylene per 100 parts of phenol resins and furfural polymer provides a foam of constant dimensional stability up to 400° F., i.e., without shrinkage in comparison to similar rigid foam formed by the use of a polyethylene glycol having urethane linkages which show 5 to 7% change in dimensions over 300° F.

It's usually also desirable to provide a small, but effective, amount of surfactant to act of a cell-control or neucleating agent, to produce a uniform, fine cellular structure to the resulting rigid foam. Typical surfactants employed would include, but not be limited to, silicone surfactants in an amount generally of from about 0.15 to 5 parts by weight; for example, 0.1 to 2 parts by weight, of the surfactant to 100 parts by weight of the phenol resin and furfural-alcohol polymer in the reaction mixture. Typical silicone surfactants which may be employed include those nonhydrolyzable silicone surfactants, such as those described in U.S. Pat. Nos. 3,772,224 and 3,849,156, and those polyalkylene glycol silicones and dimethyl silicone surfactant and block copolymers commonly employed in foam preparation. An organometal catalyst, or other suitable catalyst, is employed in the reaction mixture, to effect the condensation and polymerization reactions.

Optionally, if desired, a wide variety of other chemicals, additives, fillers, property enhancers and reinforces may be incorporated in the resinous reaction mixture, such as, for example, antioxidants, stabilizers, antistatic agents, biocides, dyes, fibers, fillers, particles, clays, flame retardants, fungicides, heat stabilizers, lubricants, plasticizers, viscosity-control agents, ultraviolet absorbers and other additives.

In the method of preparing the rigid foam products of the invention, the furfural-alcohol polymer, having reactive free hydroxyl groups, and the phenol-formaldehyde resin with free formaldehyde and a methylene diphenyl isocyanate, having a high functionality, are mixed together with a melamine or a blowing agent, a catalyst and other additive materials, to generate an exotherm e.g., to 160°–180° F., to provide for the curing the polymerizing of the reactants. The reaction may be commenced at room temperature and carried out ranging from about 60° F. to 250° F.; for example, 80° F. to 180° F. The amounts of the necessary and optional reactants, in the preparation of my rigid foam, may vary, as set forth more particularly in the following Table I. However, it is desirable to employ, due to the high cost of furfural-alcohol polymer and the methylene diphenyl isocyanate, lower and controlled amounts of these ingredients, to reduce the cost of the resulting rigid foam.

TABLE I

| | | Range Parts by Weight of Formulation phr | |
|---|---|---|---|
| | | General | Preferred |
| 1. | Phenolic resin (phenol/CH$_2$O) | 100 | 100 |
| 2. | Furfural-alcohol polymer | 10–90 | 30–70 |
| 3. | Blowing Agent | 0.5–15 | 1–10 |
| 4. | Catalyst | 0.5–15 | 1–10 |
| 5. | Surfactant | 0.05–5.0 | 0.1–2.0 |
| 6. | Melamine | 50–250 | 100–200 |
| 7. | Methylene diphenyl isocyanate | 50–250 | 100–200 |
| 8. | Halocarbon diluent | 5–60 | 20–40 |

My rigid foam product and method of preparing the foam product will be set forth for the purpose of illustration only, in certain embodiments and examples;

however, it is recognized that various modifications, changes and improvements thereon may be made by a person skilled in the art, all falling within the scope and content of my invention.

DESCRIPTION OF THE EMBODIMENTS

EXAMPLE 1

A thermosetting reaction mixture was prepared at room temperature by mixing together the following formulation:

| Parts by Weight | |
|---|---|
| 100 parts | Phenolic-formaldehyde resin (222-000)[1] |
| 25 parts | Furfuryl-alcohol polymer (4622)[2] |
| 25 parts | Freon II (trichloro fluoromethane) |
| 2 parts | UL - 22 catalyst (oranotin-sulfur catalyst)[3] |
| 2 parts | Silicone surfactant (DC-197) |
| 150 parts | Melamine |
| 125 parts | MDI (MR-200)[4] |
| | Mixing time - 20 seconds |
| | Rise time - 40 seconds |
| | Tack-free - 60 seconds |
| | Cure - 118 seconds |
| Density 2.0 PCF | |
| Closed-cell 90% | |
| Surface friable only; however, inside of foam shows no friability | |
| Material NB (nonburning) | |
| K-factor - .12 | |
| Compressive strength - 36 p.s.i. | |

Material Description
[1] Phenolic resin 222-000 (Ashland Chemical)
benzylic ether
Ratio phenol-formaldehyde - 1/1.5
H₂O - .2
Free phenol - 10
Free formaldehyde - 1.4 - OH #530
Viscosity - 50,000 CPS
[2] Furfuryl-alcohol resin - 4622 (Quaker Oaks)
Viscosity - 15,000 CPS - Thixotropic
OH #140
Acid # - .4
H₂O - .2
[3] Caltalyst - UL 22 (Witco Chemical)
Organotin sulfur
[4] Methylene diphenyl isocyanate
MR - 200 (Mobay Chemical)
2,000 viscosity
NCO - 31
High functionality MDI = 3

EXAMPLE 2

A thermosetting reaction mixture was prepared at room temperature by mixing together the following formulation:

| Parts by Weight | |
|---|---|
| 100 parts | Phenolic 222-000 |
| 35 parts | 4622 FA resin |
| 15 parts | Perchloroethylene |
| 25 parts | Blowing agent - Freon 11 |
| 2 parts | Surfactant - DC - 197 |
| 2 parts | UL - 22 |
| 150 parts | Malamine |
| 150 parts | MDI |
| | Mixing time - 20 seconds |
| | Use time - 40 seconds |
| | Tack-free - 60 seconds |
| | Cure - 125 seconds |
| Closed-cell 90% | |
| No friability | |
| Density - 2.0 pcf. | |
| Still NB (nonburning) | |
| K-factor - .11 | |

| Parts by Weight | |
|---|---|
| Compressive strength - 32 psi | |

The material made from Example 2 is useful in making a pipe insulation, where high temperatures are required, cold storage roofing board, sheathing or spray applications, where polyurethanes can no longer be used.

Furfuryl alcohol, alone, has been attempted with MDI and the trimerization catalyst, to produce foams; however, these foams do not have wholly acceptable burn and smoke properties, since they still burn or smoke, although less than a standard isocyanate or isocyanurate-type foam. Further, standard resole phenolic resins, when tried with MDI and standard amine catalysts, produce very friable, open-cell, low-strength foams that have unacceptable burning and flame characteristics. As set forth more particularly in Example 2, it has been found that minor amounts of a non-volatile diluent, such as perchloroethylene, is helpful.

While not wishing to be bound by any theory of operation, it appears that the free phenol in the phenol formaldehyde and the furfural-alcohol polymer engage in competitive reaction with the melamine, while the MDI also reacts with the furfural-alcohol polymer and the phenol resin in the presence of the catalyst, to produce a unique, highly cross-linked, rigid foam of the invention.

What I claim is:

1. A method of preparing a thermosetting foam product, which method comprises: reacting 100 parts of a phenol-formaldehyde resin having a mole ratio of phenol to formaldehyde of from about 1:1.2 to 1:2.0 with from about 10 to 90 parts of a furfural-alcohol polymer, and with from 50 to 250 parts of melamine, and with from 50 to 250 parts of methylene diphenyl isocyanate, the reaction carried out in the presence of a blowing agent, and a catalytic amount of an isocyanate trimerization catalyst, to provide a substantially closed-cell thermosetting foam characterized by low friability and high structural strength and with good flame and heat properties.

2. The method of claim 1 wherein the furfural-alcohol polymer comprises an acid-catalyzed furfural-alcohol polymer having generally head-to-tail polymerization of the furfural alcohol in the polymer chain and having reactive hydroxyl groups in the polymer.

3. The method of claim 1 wherein the phenol-formaldehyde resin comprises a benzylic-type phenol-formaldehyde resin.

4. The method of claim 3 wherein the phenol-formaldehyde resin has a mole ratio of phenol to formaldehyde ranging from about 1.2 to 1.4.

5. The method of claim 1 wherein the catalyst comprises an organotin catalyst.

6. The method of claim 5 wherein the organotin catalyst comprises an organotin-sulfur catalyst.

7. The method of claim 1 wherein the organotin catalyst comprises a dibutyl tin dicarboxylate catalyst.

8. The method of claim 1 wherein the blowing agent comprises a liquid chlorofluoro alkane.

9. The method of claim 1 wherein the reaction mixture includes a cell-control amount of a silicone surfactant.

10. The method of claim 1 which includes adding from about 5 to 60 parts per 100 parts of phenol resin of a liquid non-volatile halocarbon having a boiling point of greater than about 200° F. to reduce or eliminate surface friability of the rigid foam.

11. The method of claim 10 wherein the halocarbon comprises perchloroethylene.

12. A method of preparing a thermosetting, rigid foam product, which method comprises reacting 100 parts of a phenol-formaldehyde resin of the benzylic ether type, having a mole ratio of phenol to formaldehyde of from about 1:1.2 to 1:2.0, with a furfural-alcohol polymer which is composed of a generally head-to-tail polymerization with the furfural alcohol in the polymer chain and having reactive hydroxyl groups in the polymer, the furfural-alcohol polymer present in an amount of from about 10 to 90 parts and with melamine in an amount of from about 50 to 250 parts, and with methylene diphenyl isocyanate in an amount of from about 50 to 250 parts in the presence of from about 0.5 to 15 parts of a blowing agent, 0.5 to 15 parts of an organotin catalyst, and from about 0.05 to 5.0 parts of a cell control surfactant, to provide on reaction a thermosetting, rigid, substantially closed-cell foam product of good structural strength and low friability and good flame-retardant and heat properties.

13. The method of claim 12 which includes adding to the reaction mixture from about 5 to 60 parts per 100 parts of the phenol resin of a perchloroethylene.

* * * * *